July 4, 1967  S. FRINDEL  3,328,885
DEVICE FOR THE PRECISE MEASUREMENT OF STRAIGHT-LINE PROFILES
Filed April 7, 1964  4 Sheets-Sheet 1
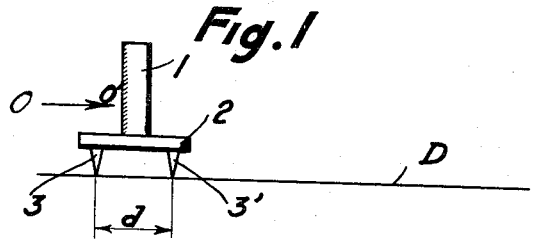
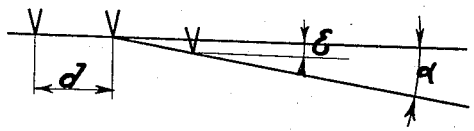
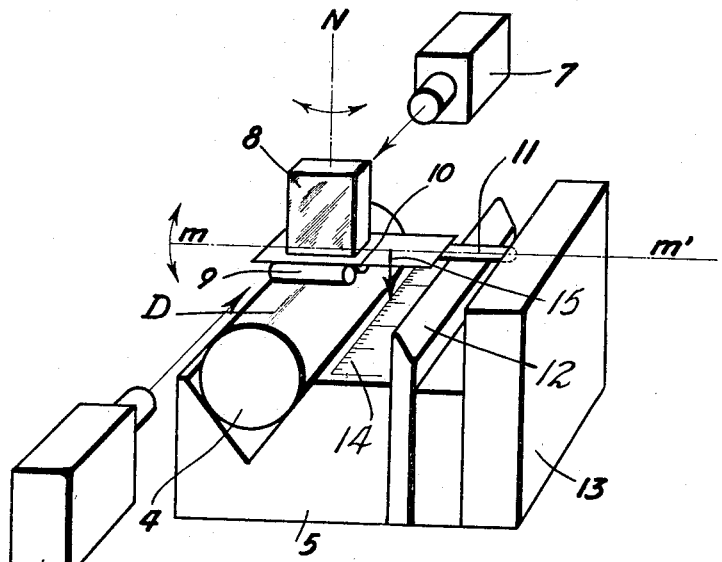
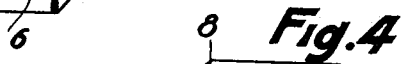
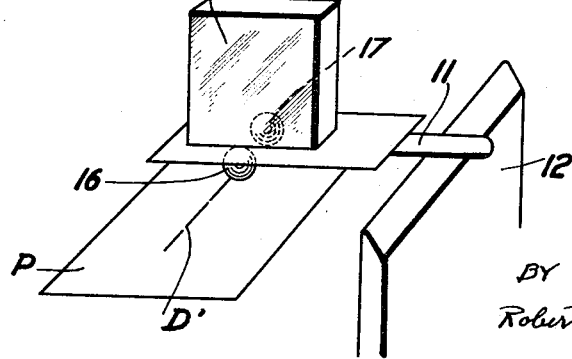
INVENTOR
SÉBASTIEN FRINDEL
BY
Robertson Smythe & Bryan
ATTORNEYS INVENTOR
SÉBASTIEN FRINDEL
BY
Robertson, Smythe & Bryan
ATTORNEYS

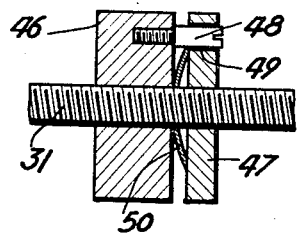
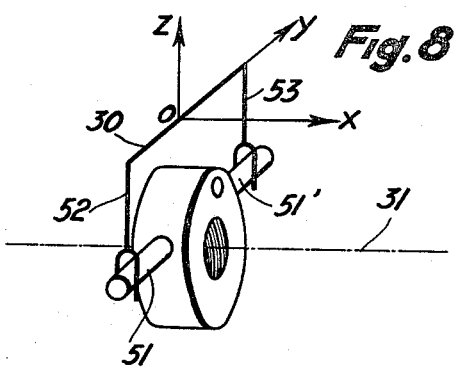
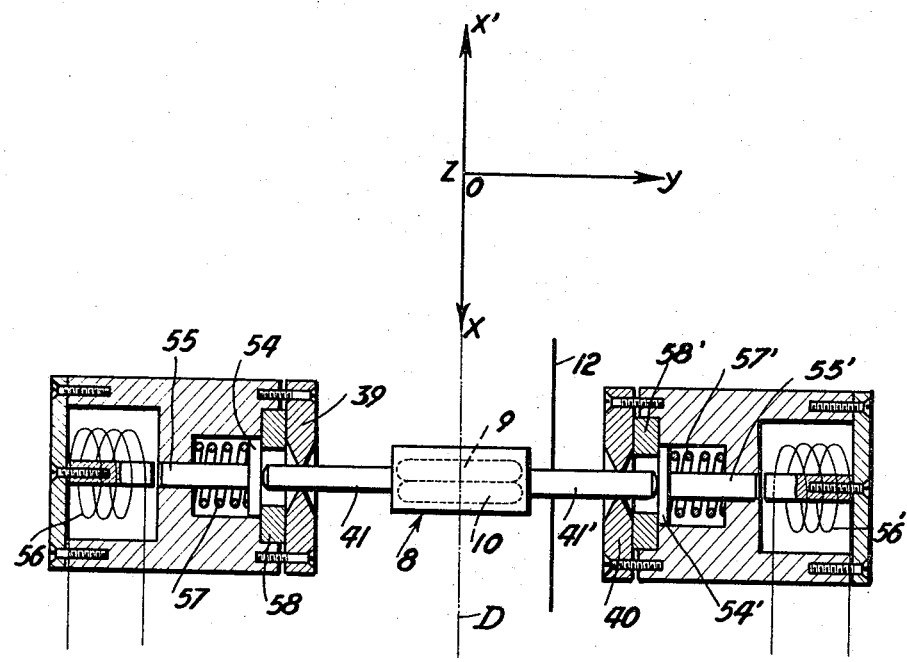
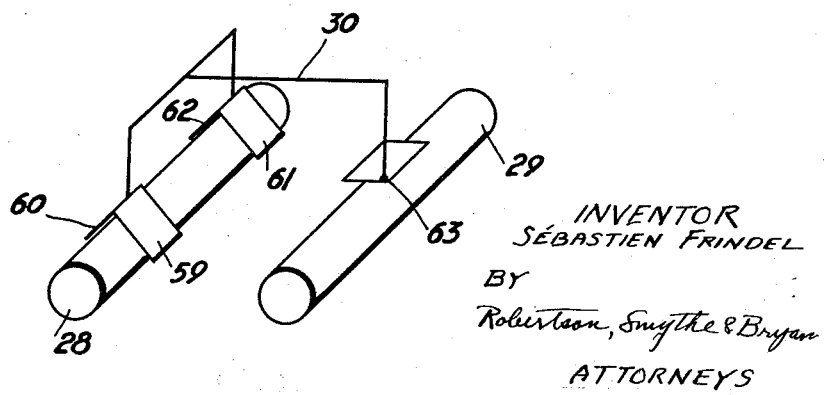

July 4, 1967  S. FRINDEL  3,328,885
DEVICE FOR THE PRECISE MEASUREMENT OF STRAIGHT-LINE PROFILES
Filed April 7, 1964  4 Sheets-Sheet 4
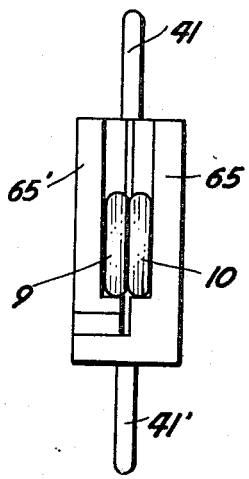
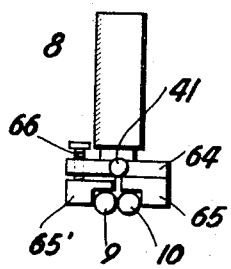
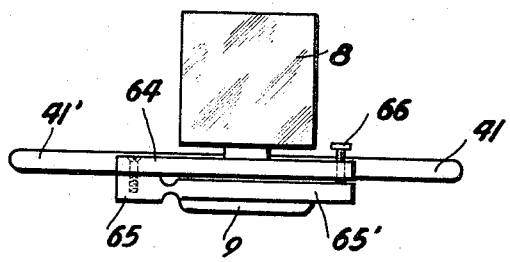
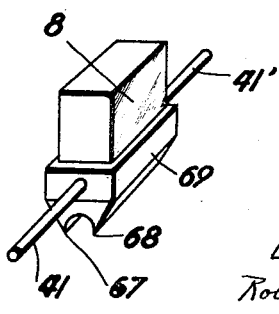
INVENTOR
SÉBASTIEN FRINDEL
BY
Robertson, Smythe & Bryan
ATTORNEYS

United States Patent Office 3,328,885
Patented July 4, 1967

3,328,885
DEVICE FOR THE PRECISE MEASUREMENT OF STRAIGHT-LINE PROFILES
Sébastien Frindel, Annecy, Haute-Savoie, France, assignor to Societe Anonyme: Societe Alsacienne de Constructions Atomiques de Telecommunications et d'Electronique Alcatel, Paris, France, a corporation of France
Filed Apr. 7, 1964, Ser. No. 357,918
Claims priority, application France, Apr. 17, 1963, 931,706
7 Claims. (Cl. 33—46)

The present invention relates to a device for the precise measurement of profiles of straight lines.

It is well known that in order to construct high precision instruments, it is of primary importance, to dispose of means for the control of the straightness of certain of the guiding or operating parts thereof.

Various devices are already known, especially devices embodying mechanical means such as comparators, adapted to perform controls of the perfect linearity of such parts.

It is an object of the invention to provide a device for accurately measuring the profiles of straight lines, i.e. adapted to measure the lack of straightness of generatrices of plane or cylindrical surface, the ideal geometrical shape of said generatrices being a straight line.

The device according to the invention comprises essentially: a support adapted to receive the object to be measured; a carriage assembly moving in parallel relationship with the generatrices of said object; a mirror, driven by said carriage assembly, integral with probe means put in contact with the generatrix to be explored, said mirror being attached to the carriage assembly by means of connecting links such that the mirror may freely pivot about an axis perpendicular to said generatrix; and, finally, a precision autocollimator, the optical axis of which forms a perfect straight line of reference which is parallel to said generatrix and perpendicular to the plane of the mirror, whereby rotations of the mirror resulting from level differences in the profile of the generating line during the travel of the carriage may be measured.

The carriage assembly is driven, along its axis, by a fixed screw rotated by a crank-handle, said rotation being transmitted to a needle moving past a dial the reading of which provides, in conjunction with the micrometer reading of the collimator, the characteristics of the lack of straightness of the explored generatrix.

The dial indicating the linear movements of the carriage is equipped, in addition, with a counter recording the length of the explored portion of the generatrix.

The autocollimator is preferably mounted on a support comprising adjusting means providing the parallelism between the optical axis of the collimator and the generatrix explored.

In a preferred embodiment, the members connecting the mirror to the carriage include a pair of vertical forks supported by said carriage, between the arms of which are freely inserted two horizontal rods, one of which rests on the edge of a knife parallel to the generatrix explored.

The probe means integral with the mirror and put in contact with the generatrix may include two needle members welded or otherwise bonded to the lower end of the mirror or two edges formed directly at the base thereof, the generatrices of the needle members or the mirror edges being pependicular to the explored generating line.

The connection between the carriage and the driving screw comprises advantageously a two-section nut adapted to pivot about a horizontal axis, one of the screw sections moving in translation relationship to the other in order to compensate for the play on the screw thread by means of a resilient washer inserted between said two screw sections. A cotter-screw enables to rotatingly interlock both sections of the screw after adjustment by opposite screwing.

The rods integral with the mirror bear, on both sides thereof, against core members forming side stop members when urged by spring means, so as to block the mirror during the movements of the carriage, said cores being attracted by electromagnets during the scanning, in order to allow the mirror to freely pivot about a line parallel to the axis of said rods.

Said probe means integral with the mirror could consist of spherical elements in the event the generatrices to be explored form part of a plane surface.

The support of the object to be explored includes a block member formed with a V-shaped milled portion in case the object is examined is cylindrical, said milled portion being provided on its inner faces with needles perpendicular to the edge of the V and forming a four-point bearing to said object.

The object carrying support is integral with a pad member fitted with three locking screws.

The guiding of the carriage is achieved by means of two cylindrical rail sections parallel to the generating lines to be explored and whereon said carriage is supported on five points.

Various embodiments of the invention are described hereinafter, reference being had to the appended drawings, in which:

FIGURES 1 and 2 are diagrams illustrating the principle of operation of the device according to the invention.

FIGURE 3 shows diagrammatically means for exploring generatrices of cylindrical surfaces.

FIGURE 4 shows diagrammatically means for exploring generatrices of plane surfaces.

FIGURE 7 is a cross-sectional view of the connecting nut between the carriage assembly and the driving screw thereof.

FIGURE 8 shows diagrammatically the assembly of the nut in the carriage.

FIGURE 9 shows the arrangement of the mirror between the driving forks.

FIGURE 10 illustrates the guiding system of the carriage assembly.

FIGURES 11 to 13 are detail views of the arrangement of the mirror, and

FIGURE 14 is an alternative arrangement of the mirror.

Figure 5:
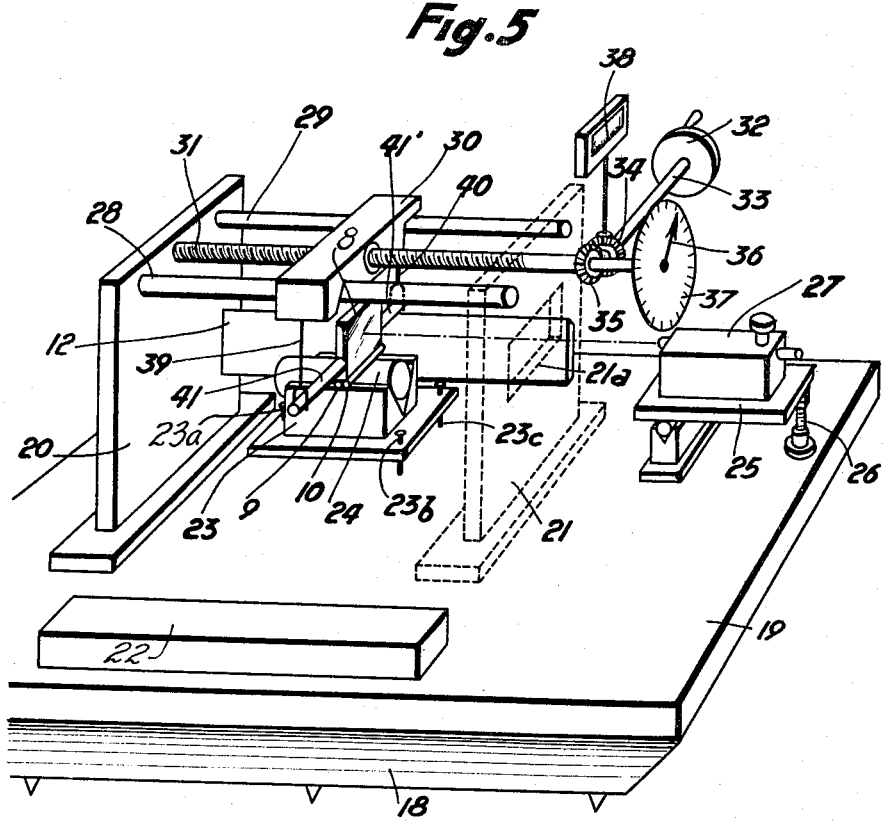
FIGURE 5 shows diagrammatically the general arrangement of a device according to the invention.

The design of the measuring device according to the invention takes account of the following considerations.

The object of the device is to reveal the lack of straightness of generatrices of plane or cylindrical surfaces, i.e. to measure the deviation between the said lines and the straight line which should be considered as the perfect theoretical, geometrical shape thereof.

According to the invention, the said perfect straight line of reference is formed, as shown in FIGURE 1, by the optical axis $o-o'$ of an autocollimator and it is relative to said axis that the profile of a generating line D to be controlled may be measured.

To this end, a plane mirror 1 is secured on a mounting 2 comprising two knives 3 and 3' spaced apart from one another by a distance $d$.

Now, if, starting from an initial position of the mirror, the said mirror is moved by successive segments of a value $d$ along a generatrix line D having a length L, the number of moves is the integer next lower in value to:

$$\frac{L-d}{d}$$

Between two adjacent positions of the mirror, there may occur a level difference $\epsilon$ of the profile D (FIGURE 2). This level difference causes the mirror to rotate about an axis normal to the plane of the figure by an angle:

$$\alpha = \epsilon/d \text{ radians}$$

The rotation $\alpha$ of the mirror may then be read by means of the autocollimator, these rotations being small and of the order of a few seconds to a few tens of seconds of an arc, and therefore:

$$\alpha \approx \tan \alpha \approx \epsilon/d \quad (1)$$

and in a coordinate system where D is parallel to $ox$, setting $$\epsilon = \Delta y \text{ and } d = \Delta x$$

then:

$$\Delta y / \Delta x = \alpha \quad (2)$$

The profile D is obtained by integration:

$$y_{(x)} = \int_0^x \alpha \Delta x + C \quad (3)$$

C being the integration constant.

With a Wild autocollimator, enabling to read rotations of 1″ of an arc, i.e. substantially $5.10^{-6}$ radians, and $\Delta x = d = 4$ mm., level differences $$\Delta y = 4 \times 5 \times 10^{-6} = 2 \times 10^{-5}$$

mm. $= 0.02\mu$ may be read.

This detection sensitivity may be further increased by using an autocollimator of a higher resolution. The integration constant C of Equation 3 defines the profile $y(x)$. In order to obtain a profile approaching as much as possible to the real profile, it is necessary to measure several times the same generatrix. When effecting these measurements, these values have random errors included and the various curves plotted after each measurement are not superposable in a rigorous manner. It is thus possible to trace envelope curves of the maximum and minimum ordinates through each point, E being the maximum spacing occurring between these two curves.

In order for the integration constant C to be fixed for each particular curve $y = f(x)$, an "initial condition" is set corresponding to the uniqueness of the profile measured. The curves $y = f(x)$ must therefore be superposable, such superposition being achieved by relative translations parallel to $oy$. To obtain the maximum measurement error, the maximum and minimum envelope curves are moved towards one another by E/2 by a translation motion parallel to $oy$. The profile of D represented by $y = f(x)$ is then given by the arithmetic mean value of the measurements effected at each point, to within $\pm E/4$, this arithmetic mean value coinciding with the graphic mean value of the envelope curves if the number of measurements is sufficiently large.

With the above data, $d = 4$ mm. and the use of the Wild autocollimator, profiles have been traced with an accuracy of $\pm 0.03\mu$ and even, in certain cases, with an accuracy as high as $\pm 0.01\mu$.

FIGURE 3 illustrates diagrammatically an arrangement for measuring the straightness of generatrices of cylinders.

In this arrangement, a cylinder 4 rests on a V-shaped support 5, on four points only, in order to secure therein a perfect stability. With an autocollimator 6, the rotations about an axis $m-m'$ are measured, due to irregularities of the generating line D of the cylinder the profile of which is to be determined.

A second collimator 7 enables a mirror 8 to be positioned in a fixed direction, around the normal N to the generatrix D during the successive movements of the mirror. Two roller needles 9 and 10 each constitute a protrusion to provide a near-point contact between the mirror 8, integral with the needles, and generatrix D.

A third needle 11 also integral with the mirror bears, by one generatrix, on the straight edge of a knife 12; the spherical end of needle 11 abuts against the plane and polished surface of a block 13. This face and the edge of knife 12 are parallel to the generatrix D to within $\pm 5\mu$.

With the illustrated links, the mirror may be moved in parallel translation to generatrix D and mirror 8 may rotate, in its measuring movement, about axis $m-m'$ to test probe the profile of said generatrix.

The successive movements of mirror 8 of an amount equal to the spacing of needles 9 and 10 (i.e. the mutual distance of the axes of the needles), are measured on a scale 14 by a pointer 15 integral with mirror 8.

In order to measure the straightness errors of a straight line located in a plane P (FIGURE 4), the same method and identical arrangements as previously described may be made use of. The point-contact between mirror 8 and generatrix D′ is then provided by means of a pair of balls 16 and 17 fixed relative to the mirror 8.

In the description given hereinbefore, it has been assumed that all the movements of mirror 8: translations parallel to generatrix D and correct orientation about the normal N to said generatrix are carried out manually.

Such operations, however, are long and delicate to perform, and the device described hereunder is adapted to render them more rapid and convenient.

This device, as illustrated diagrammatically in FIGURE 5, comprises a support 18 carrying a surface plate 19 flat to an accuracy within $\pm 2\mu$, and two uprights 20 and 21. On block 19 are arranged a ruler 22 providing a straight-line reference to within $\pm 1\mu$, a support 23 for the piece 24 to be measured (in the present example, a cylinder), said support 23 being adapted to swivel by means of three fine-pitched adjusting screws $23_a$, $23_b$ and $23_c$ with a view to bringing the measured generatrix in parallel relationship with the reference line of ruler 22, and finally, a support 25 adjustable by means of a fine-threaded screw 26, carrying an autocollimator 27 the pointing beam of which traverses a window $21a$ formed in upright 21.

Uprights 20 and 21 carry the guide-bars 28 and 29 of a carriage 30, the control screw 31 of the latter and the guiding knife 12 the edge of which is straight to within $\pm 0.5\mu$. Said guide-knife and the guide-bars are adjustable and may be brought in a position parallel to ruler 22.

Control screw 31 of carriage 30 is rotated by means of a crank handle 32 secured on a shaft 33 carrying a bevel gear 34 meshing with another bevel gear 35 secured on said screw. The rotations of the screw are read by means of a pointer 36 on a dial 37 graduated in hundredths of a revolution of the screw. The number of revolutions is registered on an integrating counter 38. Assuming the pitch of the screw to be 1 millimeter, it will be seen that the movements of the carriage 30 may be measured with an accuracy of the order of a hundredth of a millimeter.

Underneath the carriage are secured two forks 39 and 40, which may be formed in cross-section as shown in FIGURE 9, in which are inserted two rods 41 and 41′ integral with mirror 8. During its translation motion parallel to ruler 22, carriage 30 drives mirror 8 through forks 39 and 40. The mirror may oscillate about a direction normal to its translation movement, in order to enable its needles 9 and 10 (replaced by balls when measuring the straight lines in a plane) to test-probe and follow the irregularities of the generatrix to be measured.

Rod 41′ rests on guide knife 12. The transversal movements of mirror 8 are limited by two vanes (not shown) forming stop means for the rods 41 and 41′. During the measurement, these vanes are pulled away through the action of an electro-magnet, as hereinafter described.

Figure 6:
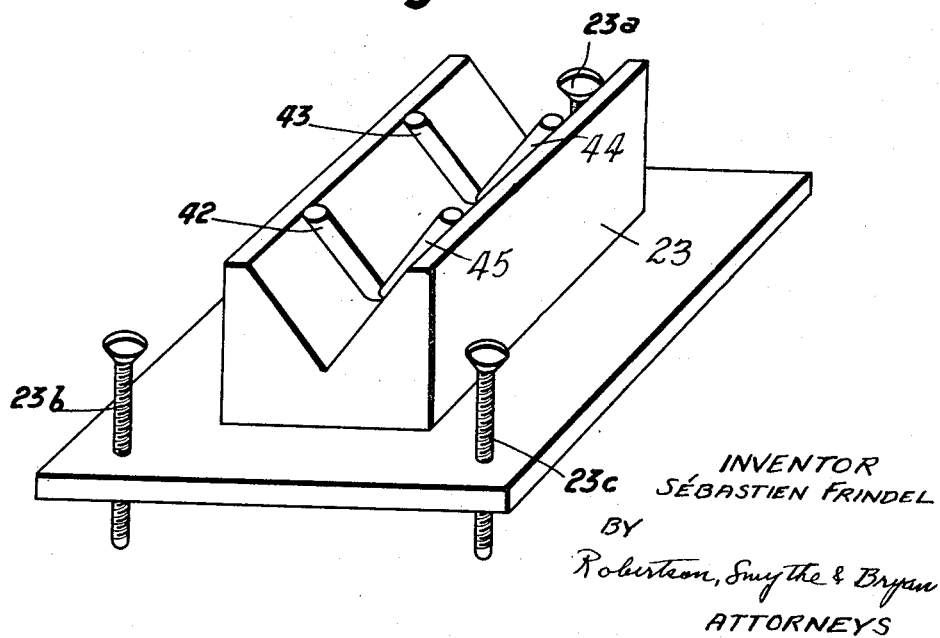
FIGURE 6 illustrates a support for cylindrically-shaped objects.

It should be noted that during the measurements the piece must be perfectly stable. In order to secure such a stability, and when measuring cylindrical pieces, a support may be made use of as shown in FIGURE 6. In the V-shaped milled portion of the pad-block 23 are welded four needles 42, 43, 44 and 45. The piece to be controlled rests on said four needles only at four points and this arrangement provides sufficient stability for a cylinder.

By adjusting the fine-threaded set screws 23a–b–c, the pad-block 23 may be orientated along an assigned direction, thus providing the desired parallelism between the generating line to be controlled and the reference ruler.

Preferably, said screws are formed with spherical end tips bearing against a block such as 19 (FIGURE 5), in an isostatic locating means of the hole-groove-plane type.

It is also possible to support a cylinder by using, for the four points of contact, four balls welded in the V-shaped milled portion of the pad-block 23.

To enable a plane to be supported, the said plane may rest on three balls integral with a pivoting pad member. Under these conditions, the plane affords three degrees of freedom which enable any desired motion in the plane of the three balls. These three degrees of freedom may be cancelled by adding three additional balls, arranged in a manner adapted to each particular case. It is generally sufficient to position a plane on three points.

As mentioned above, the movement of carriage 30 is measured by the rotations of the screw 31. This requires that the coupling between screw and carriage be effected through a play-eliminating nut system. Such a nut must, in addition, be constrained from rotation about the axis of the screw and constrained from translation relative to the carriage in a direction parallel to the movement thereof. This coupling is imperative, although the nut should not be mounted entirely fixed on the carriage, in order to avoid jamming or even lifting of the carriage during its movement, due to a misalignment between the control screw 31 and the guide-bars 28 and 29. To this end, the nut is desirably mounted in the carriage in a "half-floating," manner so as to enable a certain relative movement between the considered parts.

The means enabling the taking up of play is shown diagrammatically in FIGURE 7. Said means comprises a nut consisting of two sections 46 and 47 interlocked for rotation by means of a pin 48 screwed in section 46 and engaged in a hole formed in section 47. In fact, it is more convenient to bore six holes 49 in said section 47, so as enable both portions to move toward or away from each other by a sixth of a revolution, by screwing or unscrewing one of the sections, or both sections in opposite directions, the pin being unscrewed and then placed again after adjustment. A flexible washer 50, the tension of which is controlled by the said adjustment, maintains the two sections of the nut applied firmly against the flanks of opposite threads of screw 31 and may thus eliminate the play which exists or might occur between the threadings of said nut sections and that of the screw.

FIGURE 8 shows diagrammatically the coupling arrangement between the nut and the carriage. Part 46 of the nut is fitted with two pins 51, 51' engaging, in closely fitting relationship, between the branches of two forks 52 and 53 which are integral with carriage 30.

Considering now a system of reference axes $ox$, $oy$, $oz$ linked to the carriage, axis $ox$ being parallel to the movement direction of the carriage, i.e. to the axis of control screw 31, it is apparent that the couplings assigned allow the following movements of section 46 of the nut relative to carriage 30:

A translation motion parallel to axis $oz$;
A translation movement parallel to axis $oy$;
A rotation about the axis of pins 51, 51', parallel to axis $oy$.

A translation movement of the nut relative to carriage along axis $ox$ is impossible, as well as rotations about axis $oz$ and about the axis of the screw. This linking arrangement by means of a "half-floating" nut enables the correct transmission of the motion between screw and carriage, even if the axes of the guide-bars are not parallel to the axis of the control screw.

To effect the connection between mirror 8 and carriage 30, a similar coupling system may be used as that described in connection with the screw and carriage linking. The principle of the system is shown diagrammatically in FIGURE 5 and FIGURE 9 is a more detailed representation of the driving forks integral with the carriage and of the electro-magnet device adapted to limit the transversal movements of the mirror. Said FIGURE 9 shows a top view of mirror 8 and a cross-sectional view of forks 39 and 40 and of the electro-magnets through a plane passing through the common axis of said electro-magnets.

Mirror 8 is fixedly secured on a mounting carrying needles 9 and 10 and transversal rods 41 and 41'. Axes $ox$, $oy$, $oz$ form a trihedron fast with the mirror, axis $oy$ being contained in the median plane of the axes of needles 9 and 10 and parallel to said axes, rods 41, 41' are parallel to $oy$ and the translational movement of the mirror takes place along $ox$.

Rods 41 and 41' are engaged in the openings of forks 39 and 40 with a clearance of 0.3 to 0.5 mm.

The end portions of rods 41 and 41' bear against the flanges 54 and 54' of the core pieces 55 and 55' adapted to plunge into the coils of the electro-magnets 56 and 56'. Springs 57 and 57' maintain the flanges 54 and 54' in contact with washers 58 and 58' during the movements of the mirror, and the core pieces thus constitute stop means for rods 41 and 41', in order to prevent the transversal movements of the mirror along axis $oy$.

Once the mirror has been moved, rods 41 and 41' are released sidewise by the electro-magnets which pull away core pieces 55 and 55'. In the longitudinal direction, the contact between rods 41 and 41' and forks 39 and 40 is cancelled by moving the carriage, and, consequently, the forks, by a few hundredths of a millimeter in a direction opposite to the movement of the carriage. Thus, mirror 8 is entirely released, and rests on but two points (through needles 9 and 10) on the generating line D to be measured and on a point of rod 41' on the edge of guiding knife 12.

The "measurement" movements of the mirror are a translation movement along $oz$ and a rotation about a line parallel to $oy$; said movements take place with a minimum of friction when the mirror is supported only on the three above mentioned points.

The guiding system for the translation movement of the carriage 30 is shown diagrammatically in FIGURE 10. It includes a five-point contact device (which points consist, in fact, of five narrow bands) comprising two V-shaped pieces providing four contact points 59, 60 and 61, 62 on cylindrical guide bar 28 and a plane resting on the fifth contact point 63 on the other guide bar 29.

The two guide-bars 28 and 29 are finely ground and the shape thereof differs very little from the perfect geometrical shape of a cylinder. Their parallelism is adjusted during assembly, with very narrow tolerances.

To measure generatrices of cylinders, a mirror 8 is provided with two edges which rest practically on two points on the generatrix to be measured.

The said edges should, in principle, be rigorously rectilinear and parallel. They are physically formed by the generatrices of two roller needles the straightness of which is correct to within a few tenths of a micron.

FIGURES 11 to 13 illustrate an embodiment of such a support.

Mirror 8 is glued with sealing-wax or with "Araldite" (a plastic resin manufactured by Ciba, Basel, Switzerland) on a pad 64. On said pad are also secured two transversal rods 41 and 41' (which could also consist of a single rod), and a needle support 65 provided with an adjustable strip 65'. A channel, formed in said support 65, is adapted to receive the two needles 9 and 10, respectively secured (by gluing or welding) thereon and on strip 65'.

When considering a trihedron $ox$, $oy$, or in connection with FIGURE 13, axis $oy$ being parallel to rods 41 and 41′, the parallelism of needles 9 and 10 in a projection plane parallel to xoy is achieved by mutual tangency of the two needles along a generatrix thereof. In a plane parallel to zoy, the parallelism of said needles is adjusted by moving the resilient strip 65′ by means of a set screw 66.

Mirror 8 may also be mounted in quite a different way. Thus, it may comprise as shown in FIGURE 14, parallel edges 67 and 68 cut directly in the body thereof and playing the part of the contact generatrices of needles 9 and 10. The probe mirror thus established may then be set in a mounting 69 on which rods 41 and 41′ are secured.

What I claim is:

1. A device for the precise measurement of straight-line profiles, comprising a precision autocollimator with an optical axis thereof serving as a reference axis; a stationary support adapted to receive the object to be measured for orienting a straight-line generatrix thereof into parallelism with said reference axis; a carriage movable along the object to be measured and in parallelism with said axis; a mirror transverse to said axis; probe means in fixed relation to said mirror and providing a pair of work contact protrusions spaced from each other along the direction of said axis; mounting means in fixed relation to said mirror and said probe means; two forked members driven by said carriage; said mounting means comprising pivot elements engaging pivotally within and slidable toward and away from said object along said forked members so as to enable said mirror to freely pivot into two-point work contact about an axis perpendicular to the straight-line profile being explored and arranged so that said probe means will be maintained in two-point contact with said straight-line profile, said autocollimator being adapted to measure the rotations of the mirror, with respect to said optical reference axis, caused by differences in level of said straight-line profile.

2. A device as claimed in claim 1, wherein the two fork members are driven by a lead-screw and including two mutually aligned rods positioned on opposite sides of said mirror, said rods being movable within said fork members without play in the direction of said axis, one of said rods remaining supported on a straight knife-edge parallel to the generatrices being explored.

3. A device as claimed in claim 1, said protrusions being formed by two parallel needles rigidly dependent from said mounting in parallel relationship to said mirror and in perpendicular relationship to the straight-line generatrices to be explored.

4. A device as claimed in claim 1, wherein said protrusions are two edges integral with the base of said mirror.

5. A device as claimed in claim 1, including a lead-screw for driving said carriage, a backlash compensating system comprising a two-section nut assembly mounted on said carriage driving lead-screw, and an elastic member positioned on said lead-screw between said two nut sections and clamped therebetween, one of said nut sections having six apertures extending therethrough and the other nut section having a screw-thread tapped thereinto for receiving a screw which passes through one of said six holes whereby to set the two nut sections in mutually spaced relationship.

6. A device as claimed in claim 1, wherein said mounting means comprises rods fast with said mirror on either side thereof, said device further comprising an electromagnet mounted on each of said forks and each having a plunger core and spring means maintaining said cores in pressure contact with said rods so as to lock said mirror during movement of said carriage, said cores being retracted by said electromagnets in the course of the exploration to enable said mirror to freely pivot about an axis parallel to the axis of said rods.

7. A device as claimed in claim 1, wherein said probe means are two spherical elements of which the points of contact with a plane surface to be verified define a direction parallel to the generatrices of said surface.

References Cited

UNITED STATES PATENTS

| | | | |
|---|---|---|---|
| 1,662,836 | 3/1928 | Steinle | 33—46(.2) X |
| 2,009,519 | 7/1935 | Reed | 33—164 |
| 2,048,154 | 7/1936 | Abbott et al. | 73—105 |
| 2,834,111 | 5/1958 | Sweany | 33—46(.2) |
| 3,251,135 | 5/1966 | Reason | 73—105 X |

FOREIGN PATENTS

| | | |
|---|---|---|
| 240,426 | 11/1925 | Great Britain. |
| 878,414 | 10/1942 | France. |

ROBERT B. HULL, *Primary Examiner*.